(12) United States Patent
Denstaedt

(10) Patent No.: US 10,286,729 B2
(45) Date of Patent: May 14, 2019

(54) TIRE HAVING CRACK RESISTANT SIDEWALLS

(71) Applicant: Lehigh Technologies, Inc., Tucker, GA (US)

(72) Inventor: Glenn Denstaedt, Johns Creek, GA (US)

(73) Assignee: Lehigh Technologies, Inc., Tucker, GA (US)

( * ) Notice: Subject to any disclaimer, the term of this patent is extended or adjusted under 35 U.S.C. 154(b) by 4 days.

(21) Appl. No.: 15/091,673

(22) Filed: Apr. 6, 2016

(65) Prior Publication Data

US 2016/0297243 A1    Oct. 13, 2016

Related U.S. Application Data

(60) Provisional application No. 62/144,101, filed on Apr. 7, 2015.

(51) Int. Cl.
| | |
|---|---|
| *B60C 1/00* | (2006.01) |
| *C08K 7/00* | (2006.01) |
| *C08L 7/00* | (2006.01) |
| *C08L 9/00* | (2006.01) |
| *B60C 11/03* | (2006.01) |
| *B60C 13/00* | (2006.01) |
| *C08L 91/00* | (2006.01) |

(52) U.S. Cl.
CPC ............. *B60C 1/0025* (2013.01); *C08K 7/00* (2013.01); *C08L 7/00* (2013.01); *C08L 9/00* (2013.01); *C08L 91/00* (2013.01); *B60C 2011/0341* (2013.01); *B60C 2011/0386* (2013.01); *B60C 2013/005* (2013.01)

(58) Field of Classification Search
CPC .................................................... B60C 1/0025
See application file for complete search history.

(56) References Cited

U.S. PATENT DOCUMENTS

| | | | | |
|---|---|---|---|---|
| 6,077,874 A | * | 6/2000 | Wideman ................. | B60C 1/00 521/40.5 |
| 6,265,454 B1 | * | 7/2001 | McNutt .................... | C08J 11/06 521/40 |
| 6,407,180 B1 | * | 6/2002 | Wideman ............ | B29B 17/0042 152/209.1 |
| 6,837,288 B2 | | 1/2005 | McElrath et al. ............ | 152/525 |
| 7,498,366 B2 | | 3/2009 | Taguchi ........................ | 524/83 |
| 7,759,410 B2 | | 7/2010 | Hochi ........................... | 523/155 |
| 8,592,609 B2 | | 11/2013 | Coszach et al. .............. | 549/274 |
| 8,623,956 B2 | | 1/2014 | Sugimoto et al. ............ | 524/547 |
| 8,952,098 B2 | * | 2/2015 | Mabuchi .................. | C08L 93/00 525/236 |
| 9,108,386 B2 | * | 8/2015 | Rosenmayer ............. | B32B 5/16 |
| 2005/0107484 A1 | * | 5/2005 | Cialone ................... | B29B 17/02 521/41 |
| 2006/0086838 A1 | * | 4/2006 | Waznys ..................... | B02C 2/10 241/23 |
| 2006/0086839 A1 | * | 4/2006 | Meckert .............. | B29B 17/0408 241/23 |
| 2007/0185239 A1 | * | 8/2007 | Tirelli ..................... | B60C 1/0016 523/205 |
| 2009/0272475 A1 | * | 11/2009 | Resmini ................ | B60C 1/0016 152/450 |
| 2012/0125505 A1 | * | 5/2012 | Incavo .................... | B29B 17/02 152/450 |
| 2014/0088258 A1 | * | 3/2014 | Papp ....................... | C08L 17/00 525/236 |
| 2014/0228505 A1 | * | 8/2014 | Papp ....................... | C08L 21/00 524/526 |
| 2015/0197581 A1 | * | 7/2015 | Asadauskas ............ | C08C 19/08 252/182.28 |

FOREIGN PATENT DOCUMENTS

| | | | | |
|---|---|---|---|---|
| EP | 1031440 A2 | * | 8/2000 | ........... B60C 1/0025 |
| JP | 11-181150 A | | 6/1999 | ................ C08L 7/00 |
| JP | 2006-89612 A | | 6/2006 | ................ C08L 9/00 |

* cited by examiner

*Primary Examiner* — Liam J Heincer
(74) *Attorney, Agent, or Firm* — Dority & Manning, P.A.

(57) ABSTRACT

This invention discloses a tire having crack resistant sidewalls which include a micronized rubber powder. These tires are comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein the sidewalls are comprised of 20 phr to 80 phr of natural rubber, 20 phr to 80 phr of polybutadiene rubber, and 3% over batch weight to 20% over batch weight of micronized rubber powder, wherein the micronized rubber powder has a particle size which is within the range of 40 Mesh to 300 Mesh.

15 Claims, 1 Drawing Sheet

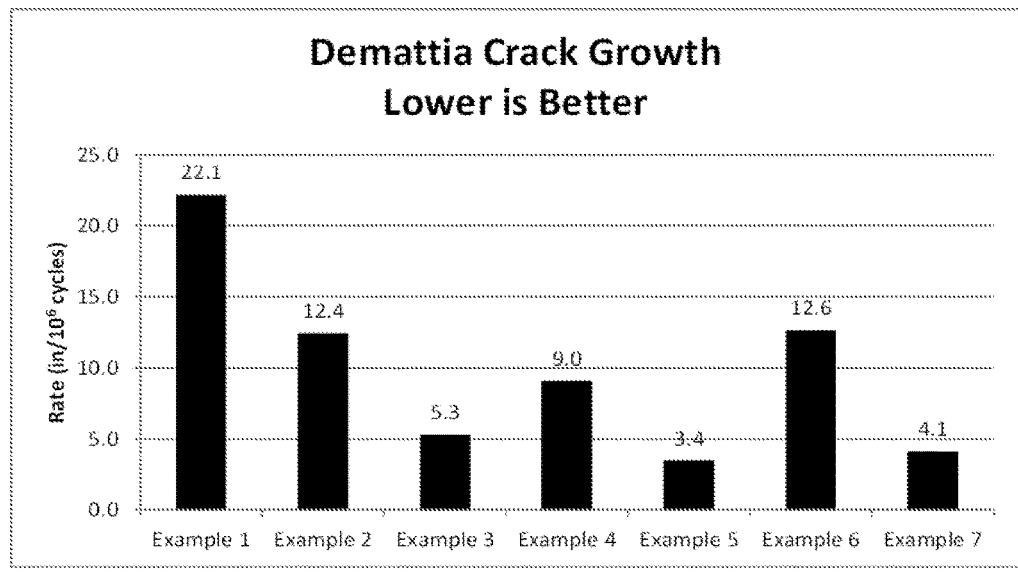

TIRE HAVING CRACK RESISTANT SIDEWALLS

The benefit of U.S. Provisional Patent Application Ser. No. 62/144,101 filed on Apr. 7, 2015 is claimed hereby. The teachings of U.S. Provisional Patent Application Ser. No. 62/144,101 are incorporated herein by reference in their entirety.

BACKGROUND OF THE INVENTION

A pneumatic tire typically includes a pair of axially separated inextensible beads. A circumferentially disposed bead filler apex extends radially outward from each respective bead. At least one carcass ply extends between the two beads. The carcass ply has axially opposite end portions, each of which is turned up around a respective bead and secured thereto. Tread rubber and sidewall rubber are located axially and radially outward, respectively, of the carcass ply.

Unfortunately, the sidewalls of tires are susceptible to degradation and cracking from exposure to ultraviolet light and ozone in the air. This problem with sidewall cracking naturally become more pronounced as the tire ages over time and can become unsightly and ultimately of tire performance concerns.

To mitigate tire sidewall cracking waxes are frequently included in tire sidewall compounds. Over time such waxes migrate to the surface of the tire sidewall and in theory form a film which helps to prevent deterioration by ozone and/or ultraviolet light. However, the use of inappropriate waxes can result in the appearance of the tire side wall being damaged.

Antioxidants are also typically added to sidewall formulations to help prevent sidewall cracking caused by ozone in the environment. However, the use of even a high level of antidegredants is not a totally satisfactory solution to tire sidewall cracking because antidegredants dissipate over time and become less and less effective. Accordingly, antidegredants may not be effective over a long tire service life. In any case, JP2006-89612A discloses a rubber composition containing specified amounts of a rubber component, paraffin wax and a gelation agent which can be used in tire treads and sidewalls. JP11-181150A discloses a rubber composition which is suitably used for a tire tread or a sidewall and comprises a rubber component and wax comprising normal paraffin in an amount of 75 to 85% by weight and iso paraffin.

U.S. Pat. No. 6,837,288 discloses rubber blends of brominated isobutylene/para-methylstyrene copolymers of 9.5 to 20 weight percent aromatic monomer content and 0.2 to 1.0 mole percent benzylic bromine content. These blends are reported to offer good cure characteristics, good adhesion and flex crack resistance, as well as ozone resistance. These blends are touted as being useful in tire sidewalls and other applications.

U.S. Pat. No. 7,498,366 discloses a rubber composition for tire sidewalls which is reported to provide an excellent appearance and weather resistance. More specifically, this patent discloses a rubber composition for a tire sidewalls comprising 45 to 60 parts by weight of a carbon black, not more than 1.5 parts by weight of powder sulfur, 0.45 to 0.5 parts by weight of N-cyclohexyl-2-benzothiazolylsulfenamide and 1.5 parts by weight of paraffin wax in which a distribution of the number of carbon atoms is 20 to 50, a ratio (iso content/normal content) of iso content to normal content is 5/95 to 20/80, and in the distribution of the number of carbon atoms of each of the iso content and the normal content, a standard deviation/average number of carbon atoms of the iso content is 1.0 to 1.8 and a standard deviation/average number of carbon atoms of the normal content is 1.0 to 1.8 based on 100 parts by weight of a rubber component comprising a butadiene rubber in an amount of 35 to 55% by weight and a natural rubber.

U.S. Pat. No. 7,759,410 discloses a rubber composition which can be used in tire sidewalls to improve tear strength, flex crack growth resistance and weather resistance. This tire sidewall rubber composition is comprised of 15 to 120 parts by weight of a white filler, and 5 to 50 parts by weight of a graphite having an average particle diameter of 3 to 50 µm on the basis of 100 parts by weight of a rubber component comprising a natural rubber in an amount of not less than 30% by weight, wherein the rubber component comprises an epoxidized natural rubber in an amount of 10 to 70% by weight.

U.S. Pat. No. 8,592,609 relates to a method of making rubber compositions having improved crack resistance. This method involves: a mixing in a first step: i. a first polymer, ii. a filler, b. mixing in a second step: i. a second polymer, ii. a polyhydroxy compound, c. mixing in a third step: i. the mixtures obtained in steps (a) and (b), ii. optionally, additional filler, wherein said first polymer and second polymer may be the same or different, and wherein steps (a) and (b) can occur simultaneously or consecutively; wherein the filler or additional filler are not present in the second step.

U.S. Pat. No. 8,623,956 describes a rubber composition that can be used in tire sidewalls to provide both excellent fuel economy (low heat build-up) and high flex crack growth resistance while having processability excellent enough to eliminate the need for mastication. This rubber composition contains a modified natural rubber with a phosphorus content of 200 ppm or less; and carbon black and/or a white filler.

U.S. Pat. No. 8,952,098 reveals a rubber composition for a tire sidewall or base tread, comprising: a rubber component comprising at least two kinds of diene rubbers; and a myrcene polymer, wherein the rubber component comprises at least one kind of diene rubber selected from the group consisting of natural rubber, epoxidized natural rubber, and butadiene rubber, and the myrcene polymer has a weight average molecular weight of 1000 to 500000. This rubber composition rubber composition is depicted as offering good flex crack growth resistance, crack initiation resistance, durability, and fuel economy when used in tire sidewalls despite the use of a softener derived from non-petroleum resources.

SUMMARY OF THE INVENTION

The present invention discloses a tire having greatly improved sidewall crack resistance as evidenced by a significant reduction of Demattia crack growth rates. This invention is based upon the unexpected finding that incorporating micronized rubber powders into natural rubber/polybutadiene rubber sidewall compounds significantly reduces crack growth in sidewalls.

The subject invention more specifically reveals a micronized rubber powder which is particularly useful for improving crack growth resistance in tire sidewall formulations wherein the micronized rubber powder has a particle size which is within the range of 60 Mesh and 160 Mesh, and wherein less than 10% by weight of the particles of the micronized rubber powder pass through a 200 Mesh screen.

The present invention also discloses a micronized rubber powder which is particularly useful for improving crack growth resistance in tire sidewall formulations wherein the micronized rubber powder has a particle size of 80 Mesh, and wherein less than 10% by weight of the particles of the micronized rubber powder pass through a 200 Mesh screen.

The subject invention further reveals a micronized rubber powder which is particularly useful for improving crack growth resistance in tire sidewall formulations wherein the micronized rubber powder has a particle size of 140 Mesh, and wherein less than 10% by weight of the particles of the micronized rubber powder pass through a 200 Mesh screen.

The micronized rubber powder will typically be in the form of particles that are immiscible in blends of natural rubber and high-cis-1-polybutadiene rubber which are typically utilized in tire sidewall formulations.

The subject invention further discloses a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein the sidewalls are comprised of 20 phr to 80 phr of natural rubber, 20 phr to 80 phr of polybutadiene rubber, and 3% over batch weight to 20% over batch weight of micronized rubber powder, wherein the micronized rubber powder has a particle size which is within the range of 40 Mesh to 300 Mesh.

In another embodiment of the present invention the tire is a pneumatic tire. In yet another embodiment of the present invention the tire is a non-pneumatic tire. In still another embodiment of the present invention the tire includes a carcass ply radially inward of the tread.

BRIEF DESCRIPTION OF THE DRAWINGS

The FIGURE shows the results of using Optical and Atomic Force Microscopy (AFM) to further investigate the reduction in crack growth rate phenomenon. This FIGURE shows that the presence of the micronized rubber powder substantially reduced the rate of crack growth in the tire sidewall rubber formulation.

DETAILED DESCRIPTION OF THE INVENTION

The tires of this invention can be manufactured utilizing conventional tire building methods with standard tire building equipment. These tires can be of any desired size and design. However, the tires of this invention differ for ordinary tires in that they have sidewalls that contain at least 3% over batch weight of a micronized rubber powder (based upon the entire weight of the sidewall rubber formulation). In any case, the tires of this invention are comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting. In some embodiments of this invention, the tire will optionally have a tread which includes at least one circumferential groove which separates circumferential ribs, each circumferential groove having a first side, a second side, and a base which is situated between the first side and the second side of the circumferential groove.

Generally, ground tire rubber (GTR) consists of particle size distributions that range from a diameter of about 0.5 mm to about 5 mm which can be produced by a variety of techniques including ambient temperature and cryogenic grinding methods. Micronized rubber powders (MRP) typically contain a significant fraction of rubber particles having a particle size of less than 100 microns. In any case, ground tire rubber and micronized rubber powders are commonly designated by mesh size as determined by ASTM D-5603. For example, an 80 mesh rubber powder is one in which 90% of particles pass through an 80 mesh screen. There is no defined minimum particle size; therefore the particle size distribution can be quite broad or even multi-modal. Powders in the size range of 10-30 mesh are normally considered to be ground tire rubber while powders having a smaller particle size which is within the range of 40-300 mesh are generally considered to be micronized rubber powder. Micronized rubber powder is typically more expensive to make by virtue of requiring more processing and/or more demanding processing conditions to attain the smaller particle size.

The reclaimed elastomeric polymers which are used as the raw material for making ground tire rubber and micronized rubber powder, such as scrap tire rubber, are cured (previously vulcanized) rubbers. They are accordingly relatively inert particles which are essentially non-reactive with virgin elastomers, which results in compromised processing and properties at high loadings. Typical micronized rubber powder compositions contain particles that are immiscible with typical sidewall rubber compositions. The use of such reclaimed rubbers in manufacturing new rubber products often leads to a compromised level abrasion resistance which greatly limits the level at which they can be incorporated into products which are subjected to abrasive forces during their service life, such as tire tread formulations, windshield wiper blades, and conveyor belts, and the like.

In one specific embodiment of this invention the micronized rubber can be made utilizing the cryogenic grinding system described in U.S. Pat. No. 7,445,170 and an impact mill as described in U.S. Pat. No. 7,861,958. The teachings of U.S. Pat. Nos. 7,445,170 and 7,861,958 are incorporated herein for purposes of describing useful techniques and equipment which can be employed in making micronized solution styrene-butadiene rubber powder that can be employed in making renewed rubber compositions in accordance with this invention. Micronized rubber powder can also be made in many other ways other than described above, such as but not limited to a wet grinding process, ambient temperature grinding procedures, and other cryogenic processes. In any case the micronized rubber powder will typically be comprised of a mixture of various cured rubbery polymers including natural rubber, synthetic polyisoprene rubber, emulsion styrene-butadiene rubber, solution styrene-butadiene rubber, and a wide variety of additional cured rubbers.

The micronized rubber powder will typically be incorporated into the tire sidewall composition at a level with is within the range of about 3% over batch weight to 20% over batch weight (based upon the total weight of the tire sidewall rubber formulation). The micronized rubber powder will normally be incorporated into the tire sidewall composition at a level with is within the range of about 5% over batch weight to 15% over batch weight and will more typically be incorporated into the tire sidewall composition at a level with is within the range of about 8% over batch weight to 12% over batch weight.

The micronized rubber powder will typically have a particle size which is within the range of 40 Mesh to 300 Mesh. The micronized rubber will normally have a particle size which is within the range of 80 Mesh to 200 Mesh and will preferable be of a particle size which is within the range of 100 Mesh to 160 Mesh. In one embodiment of this invention the micronized rubber can be of a particle size of 80 Mesh with less than 10% by weight of the particles of the micronized rubber powder being capable of passing through a 200 Mesh screen. In another embodiment of this invention the micronized rubber can be of a particle size of 140 Mesh with less than 10% by weight of the particles of the micronized rubber powder being capable of passing through a 200 Mesh screen.

The sidewall rubber formulation will typically be comprised of 20 phr (parts by weight per 100 parts of rubber by weight) to 80 phr of natural rubber and 20 phr to 80 phr of high cis1,4-polybutadiene rubber. The sidewall rubber formulation will more typically be comprised of 25 phr to 75 phr of natural rubber and 25 phr to 75 phr of high cis1,4-polybutadiene rubber. The sidewall rubber formulation utilized in the tires of this invention will typically be comprised of 35 phr to 50 phr of natural rubber and 50 phr to 65 phr of high cis1,4-polybutadiene rubber. In one embodiment of this invention the sidewall rubber formulation can further contain an EPDM (ethylene-propylene-diene monomer) rubber. Such an EPDM rubber can optionally be included at a level which is within the range of 1 phr to 40 phr and will more typically be included at a level which is within the range of 4 phr to 30 phr.

As previously explained the tires of this invention can be built utilizing standard procedures. After the tire has been built with the sidewall formulation of this invention, it can be vulcanized with sulfur using a normal tire cure cycle. Tires made in accordance with this invention can be cured over a wide temperature range. However, it is generally preferred for the tires of this invention to be cured at a temperature ranging from about 132° C. (270° F.) to about 200° C. (392° F.). It is more typical for the tires of this invention to be cured at a temperature ranging from about 143° C. (290° F.) to about 180° C. (356° F.). It is generally preferred for the cure cycle used to vulcanize the tires of this invention to have a duration of about 10 minutes for smaller tires to about 20 hours for very large tires.

The sulfur used in curing the tire may be powdered sulfur, precipitated sulfur, and/or insoluble sulfur. The sulfur donor may be tetramethylthiuram disulfide, tetraethylthiuram disulfide, tetrabutylthiuram disulfide, dipentamethylene thiuram hexasulfide, dipentamethylene thiuram tetrasulfide, dithiodimorpholine, and/or mixtures thereof. The amount of the sulfur or sulfur donor may range from 0.001 to 10 weight percent, based on the weight of the plain microflakes.

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils.

The rubber composition may further include from about 10 to about 150 phr of silica. Siliceous pigments which may be used in the rubber compound include conventional pyrogenic and precipitated siliceous pigments (silica). Such conventional silicas might be characterized, for example, by having a BET surface area, as measured using nitrogen gas. The BET surface area may be in the range of about 40 to about 600 square meters per gram. The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 micron to 0.05 micron, as determined by an electron microscope, although the silica particles may be even smaller, or possibly larger, in size. A wide variety of commercially available silicas can be used.

Commonly employed carbon blacks may be used as a conventional filler in an amount ranging from 10 to 150 phr. The carbon blacks may have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels, and plasticized starch composite filler. Such other fillers may be used in an amount ranging from 1 to 30 phr.

It may readily be understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. In many cases microcrystalline waxes are used. Typical amounts of peptizers comprise about 0.1 to about 1 phr. Typical peptizers may be, for example, pentachlorothiophenol and dibenzamidodiphenyl disulfide.

Accelerators may be used to control the time and/or temperature required for vulcanization and to improve the properties of the vulcanizate. A single accelerator system may be used, i.e., primary accelerator. The primary accelerator(s) may be used in total amounts ranging from about 0.5 to about 4 phr. Combinations of a primary and a secondary accelerator may be used with the secondary accelerator being used in smaller amounts, such as from about 0.05 to about 3 phr, in order to activate and to improve the properties of the vulcanizate. Combinations of these accelerators may be expected to produce a synergistic effect on the final properties and are somewhat better than those produced by use of either accelerator alone.

In addition, delayed action accelerators may be used which are not affected by normal processing temperatures, but produce a satisfactory cure at ordinary vulcanization temperatures. Vulcanization retarders might also be used. Suitable types of accelerators that may be used are amines, disulfides, guanidines, thioureas, thiazoles, thiurams, sulfenamides, dithiocarbamates and xanthates.

gredants, process aids, accelerators, and retarders. As shown in Table 1, in Examples 2, 4 and 6, 10.15 phr of micronized rubber powder was used. In Examples 3, 5, and 7, 21.42 phr of micronized rubber powder was used. In Examples 2, 4, and 6, a reduction of crack growth rate in the range 40 to 60% was observed. In Examples, 3, 5 and 7, a reduction of crack growth in the range of 75 to 85% was observed. Examples 4 and 5 showed the greatest reduction, with Example 4 showing a nearly 60% reduction and Example 5 showing a nearly 85% reduction.

TABLE 1

|  | Example 1 | Example 2 | Example 3 | Example 4 | Example 5 | Example 6 | Example 7 |
|---|---|---|---|---|---|---|---|
| Sidewall compound | Control | 5% PolyDyne ® 80 | 10% PolyDyne ® 80 | 5% PolyDyne ® 140 | 10% PolyDyne ® 140 | 5% PolyDyne ® 200 | 10% PolyDyne ® 200 |
| Units | PHR | PHR | PHR | PHR | PHR | PHR | PHR |
| Natural Rubber | 40.00 | 40.00 | 40.00 | 40.00 | 40.00 | 40.00 | 40.00 |
| High Cis Poybutadiene | 60.00 | 60.00 | 60.00 | 60.00 | 60.00 | 60.00 | 60.00 |
| PD80 |  | 10.15 | 21.42 |  |  |  |  |
| PD140 |  |  |  | 10.15 | 21.42 |  |  |
| PD200 |  |  |  |  |  | 10.15 | 21.42 |
| Process Oil | 21.00 | 21.00 | 21.00 | 21.00 | 21.00 | 21.00 | 21.00 |
| Carbon Black | 60.00 | 60.00 | 60.00 | 60.00 | 60.00 | 60.00 | 60.00 |
| Antidegradant | 3.00 | 3.00 | 3.00 | 3.00 | 3.00 | 3.00 | 3.00 |
| Wax Blend | 1.00 | 1.00 | 1.00 | 1.00 | 1.00 | 1.00 | 1.00 |
| Zinc Oxide Dispersion | 3.53 | 3.53 | 3.53 | 3.53 | 3.53 | 3.53 | 3.53 |
| Stearic Acid | 1.00 | 1.00 | 1.00 | 1.00 | 1.00 | 1.00 | 1.00 |
| Accelerator | 1.00 | 1.00 | 1.00 | 1.00 | 1.00 | 1.00 | 1.00 |
| 80% Sulfur Dispersion | 2.13 | 2.13 | 2.13 | 2.13 | 2.13 | 2.13 | 2.13 |
| Retarder | 0.10 | 0.10 | 0.10 | 0.10 | 0.10 | 0.10 | 0.10 |
| Total PHR | 192.75 | 202.90 | 214.17 | 202.90 | 214.17 | 202.90 | 214.17 |
| Demattia Crack Growth Rate (inches/1 MM cycles)* | 22.10 | 12.40 | 5.30 | 9.00 | 3.40 | 12.60 | 4.10 |

*Demattia Crack Growth Rates were determined in accordance with ASTM D813.

Examples of pneumatic tires having sidewalls which are formulation with micronized rubber powders in accordance with this invention include race car tires, passenger car tires, runflat tires, aircraft tires, agricultural tires, earthmover tires, off-the-road tires, medium truck tires, or any other type of pneumatic or non-pneumatic tire. In one example, the tire is a passenger or truck tire. The tire may also be a radial ply tire or a bias ply tire.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

In this series of experiments tire sidewall compounds were formulated, mixed and cured for testing. Comparative Example 1 was conducted as a control and did not include any micronized rubber powder. However, Examples 2-7 contained either 5 weight percent over batch weight or 10 weight percent over batch weight of a micronized rubber powder having a mesh size of 80, 140, or 200. The control compound was formulated with 40 phr of natural rubber, 60 phr high cis polybutadiene rubber, 21 phr of process oil, and 60 phr of reinforcing carbon black. The remainder of the ingredients were standard rubber chemicals such as antide- Optical and Atomic Force Microscopy (AFM) were used to further investigate the reduction in crack growth rate phenomenon. The results are shown in the FIGURE. Example 1 exhibited clean, unobstructed crack growth. This is in contrast to Examples 2-7 which contained the micronized rubber powder where crack growth was observed to have been obstructed by fine particles of the micronized rubber powder. It is believed that the micronized rubber powder obstructed crack growth dampening the ability of cracks to propagate throughout the rubber structure. In any case, the presence of the micronized rubber powder substantially reduced the rate of crack growth in the tire sidewall rubber formulation.

While certain representative embodiments and details have been shown for the purpose of illustrating the subject invention, it will be apparent to those skilled in this art that various changes and modifications can be made therein without departing from the scope of the subject invention.

What is claimed is:

1. A tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein the sidewalls are comprised of 20 phr to 80 phr of natural rubber, 20 phr to 80 phr of polybutadiene rubber, and 3% over batch weight to 20% over batch weight of a reclaimed elastomer additive, based upon the total sidewall formulation, wherein the reclaimed elastomer additive consists of cryogenically ground micronized rubber powder having a particle size which is within the range of 120 Mesh to less than 200 Mesh, and wherein at least 30% by weight of the particles of the micronized rubber powder pass through a 200 Mesh screen.

2. The tire as specified in claim 1 wherein the tread includes at least one circumferential groove which separates circumferential ribs, each circumferential groove having a first side, a second side, and a base which is situated between the first side and the second side of the circumferential groove.

3. The tire as specified in claim 1 which is further comprised of a carcass ply which is situated radially inward from the tread.

4. The tire as specified in claim 1 wherein the sidewalls are further comprised of EPDM rubber which is present in an amount which is within the range of 1 phr to 40 phr.

5. The tire as specified in claim 4 wherein the micronized rubber powder is present at a level which is within the range of 5% over batch weight to 15% over batch weight.

6. The tire as specified in claim 5 wherein the micronized rubber powder has a particle size of 140 Mesh to less than 200 mesh.

7. The tire as specified in claim 6 wherein the natural rubber is present at a level which is within the range of 25 phr to 75 phr.

8. The tire as specified in claim 1 wherein the polybutadiene rubber is present at a level which is within the range of 25 phr to 75 phr.

9. The tire as specified in claim 1 wherein the micronized rubber powder is present at a level which is within the range of 8% over batch weight to 12% over batch weight.

10. The tire as specified in claim 1 wherein the micronized rubber powder has a particle size of 170 Mesh to less than 200 mesh.

11. The tire as specified in claim 1 wherein the natural rubber is present at a level which is within the range of 35 phr to 50 phr.

12. The tire as specified in claim 1 wherein the polybutadiene rubber is present at a level which is within the range of 50 phr to 65 phr.

13. The tire as specified in claim 1 wherein the sidewalls are further comprised of carbon black in an amount which is within the range of 20 phr to 120 phr.

14. The tire as specified in claim 1 wherein the sidewalls are further comprised of carbon black in an amount which is within the range of 30 phr to 80 phr.

15. The tire as specified in claim 1, wherein the sidewalls exhibit a Demattia Crack Growth Rate as determined in accordance with ASTM D813 of from 3.40 inches/1 MM cycles to 12.60 inches/1 MM cycles.

* * * * *